June 11, 1968     K. B. W. MacLELLAN ET AL     3,387,544

FLEXIBLE SEALS

Filed April 20, 1966     4 Sheets-Sheet 1

Inventors
KENNETH B.W. MacLELLAN
WILLIAM A.A. WITHAM

By Young & Thompson

Attorneys

June 11, 1968  K. B. W. MacLELLAN ET AL  3,387,544
FLEXIBLE SEALS

Filed April 20, 1966  4 Sheets-Sheet 4

Inventors
KENNETH B.W. MacLELLAN
WILLIAM A.A. WITHAM
By Young & Thompson
Attorneys

United States Patent Office 3,387,544
Patented June 11, 1968

3,387,544
FLEXIBLE SEALS
Kenneth B. W. MacLellan, Maryhill, Glasgow, and William A. A. Witham, Newton, Mearns, Scotland, assignors to MacLellan Rubber Limited, Glasgow, Scotland, a British company
Filed Apr. 20, 1966, Ser. No. 543,948
Claims priority, application Great Britain, May 11, 1965, 19,741/65
5 Claims. (Cl. 94—18)

ABSTRACT OF THE DISCLOSURE

A flexible seal for a joint preferably formed in two parts, manufactured from a resilient material and including at least one longitudinal passage extending therethrough, the top face, of the seal, being formed with at least one concave depression such that under lateral compression of the seal the top face deforms in such a way that the seal does not bulge out of the joint, and the minimum cross-sectional area of the seal in a first longitudinal plane parallel to said top face is greater than the minimum cross-sectional area of the seal in a second longitudinal plane at right angles to said first longitudinal plane.

---

This invention relates to flexible seals for joints, particularly but not exclusively expansible joints.

The term expansible joint is used herein to describe those joints whose dimensions may alter in use, for example, a joint between bridge decks or the adjacent panels of prefabricated buildings or other structures, the width of the joint altering by expansion or contraction under thermal expansion.

It will be realised that the dimensions of such a joint at any particular time will be dependent on the ambient temperature at that time and in normal circumstances will be somewhere between the maximum and minimum dimensions. In normal circumstances, therefore, a flexible seal, which has been designed to assume an undeformed shape at maximum joint dimension, will be partially distorted. For simplicity, however, such a seal will be described hereinafter in its undeformed shape.

According to the present invention there is provided a flexible seal for a joint, the seal comprising an elongated resilient member for insertion into the joint, the member having at least one longitudinally extending passage and the outside top face of the seal being provided with a concave depression, the part of the inside top face of the seal corresponding to the concave depression forming the top boundary of the passage and being convex so that, under compression of the seal in one plane as would be experienced upon closing of the joint, the surrounding portions of the seal will move in predetermined directions into the passage or to occupy free space within the joint, without bulging appreciably out of the joint.

Preferably the minimum cross-sectional area of the seal in a second plane at right angles to said one plane is less than the minimum cross-section area of the seal in said one plane such that the seal is capable of supporting loads acting in a direction substantially normal to said one plane.

Preferably also those parts of the seal defining the walls of the or each passage are substantially arcuate in shape such that they are readily deformable under compression as aforesaid.

Preferably the outside top face of the seal is provided with three concave depressions, the middle depression corresponding to the top boundary of the passage.

The seal may be in two parts, the first part being an elongated H member, the outer face of each side being intended to abut the facing sides of the joint, with the second part nesting within the upper half of the H member, this second part being an elongated T-shaped member, the passage being formed in the upright of the T member.

The cross-piece of the H member may be arcuate, being concave on its side adjacent the second part.

The aforesaid outer faces of the first part may be provided with outstanding feet or lugs.

Embodiments of the present invention will now be described by way of example with reference to the accompanying drawings, in which:

FIG. 1 shows a seal for an expansible joint comprising two elongated parts 1, 2 made from a resilient material, for example, natural or synthetic rubber or suitable flexible plastics material.

Figure 1:
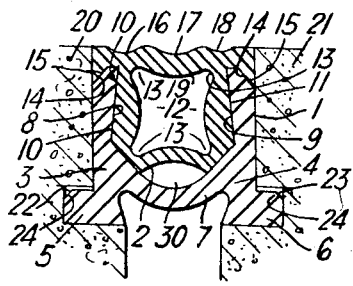
FIG. 1 shows one embodiment of the present invention in position between two concrete members.
Figure 1A:
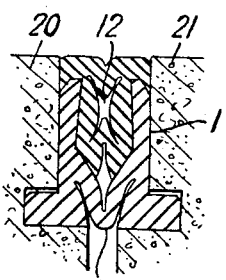
FIG. 1a shows the embodiment illustrated in FIG. 1, in a collapsed attitude as would occur on movement of the concrete members towards each other.

A first outer part 1 comprises an H-shaped member having two substantially vertical sides 3, 4 provided at their base with outstanding lugs 5, 6 and joined by an arcuate cross-piece 7, the cross-piece being convex towards the bottom of the member. The inner faces 8, 9 of the sides 3, 4 are sloped such that the space between the sides converges upwards.

A second inner part 2 in the form of a T-shaped member is shaped to nest within the upper half of the H member 1 and the vertical of tht T is provided, for this purpose, with sloping side faces 10, 11 the inclination of the faces being such that they converge towards the top of the part such that the second part 2 may be interlocked in the first part 1.

A longitudinal passage 12 is provided through the vertical of the T member, the four walls of this passage being convex, and the intersection of these walls are provided with fillets 13.

The underfaces 14 of the extremities of the cross-piece of the T member are wedge shaped to abut chamfered faces 15 on the top of the verticals of the H member.

The cross-piece of the T member is provided with undulations, there being three concave portions 16, 17, 18 spaced and bounded by convex portions. The centre concave portion 17 has the same centre of curvature as the top passage wall 19 and is consequently located with its trough on the central vertical axis of the passage. The centres of curvature of the other two concave portions 16, 18 are located substantially above the vertical walls of the passage of the second part.

In operation the seal is used in an expansible joint, for example, between a fixed bridge deck 20 and movable bridge deck 21.

The seal is manufactured in two parts H and T members, to aid its insertion into the joint and the first of said parts, the H member 1, is provided with outstanding lugs 5, 6 to locate said part in the joint, the lugs being accommodated in recesses 22, 23 formed in the concrete structures defining the joint. To insert the H member 1 into the joint, it is compressed manually and one end is fitted into place, chamfers 24 on the lug easing their insertion into the recesses 22, 23. The remainder of the part is then pushed or hammered into place.

A thin board can be forced down on the cross-bar 7, of the H member to assist fitment.

The second part, the T member 2, of the seal can then be manually compressed at one end and this end inserted into the gap between the verticals of the H member. The remaining length may then be pushed or hammered into the gap. The T member will then open out due to its own elasticity and will fill the gap thus locking the two sections together to form a composite seal.

A seal is thus formed, firmly located in the joint and abutting the structures defining the joint, thus preventing to a large extent, the ingress of dust and moisture.

The composite seal has two passages extending longitudinally therethrough, one 12, as already described, in the upright of the T member, the other 30 defined by the lower edge of that upright and the cross-bar 7 of the H member, the passage 30, enabling any moisture penetrating into the joint to be led off to each side of the deck, where, if required a hosepipe can be attached to the seal to lead the moisture away to a suitable disposal point.

The walls of these passages substantially normal to the side walls of the H member are all arcuate and will deform readily in predetermined directions when a force is applied in a direction substantially normal to said walls, that is when the seal is compressed by closing of the joint.

The composite seal, therefore, may be used in an expansible joint, the undulating cross-piece of the T member being arranged to be on the same level as the structures defining the joint. When the joint contracts due, for example, to thermal expansion the seal will deform readily to allow the contraction, the configuration of the seal, or more especially of the passages, being such that the top undulating face of the cross-piece is not displaced upwards, relative to said structures and the vertical strength of the seal is increased.

The vertical strength of the seal is a most important feature as the seal may be required to support considerable vertical loads without undue distortion, for example, vehicle loads when the seal is used in a roadway.

To test this vertical strength feature the following experiment was made. An eight-inch length of seal supported without undue distortion, a vertical load of 300 lbs. but collapsed under a horizontal load of 66 lbs. When the same specimen was supported in a joint, with the joint width at a maximum, the load supported was 3000 lbs. and, on fully compressing the seal, that is with the joint width at a minimum, the load supported was 30,000 lbs.

The seal is thus especially useful for use in traffic carrying bridges where the vertical road holding properties and the non-bulging property of the seal are desirable. Further, as the seal is manufactured in two parts and only the upper part is subjected to wear, replacement of worn parts may be carried out without disturbing the road surface. This wear may be confined to the predominant traffic lanes and it is only necessary to replace the seal in these lanes, the unworn lanes remaining in position.

Figure 2:
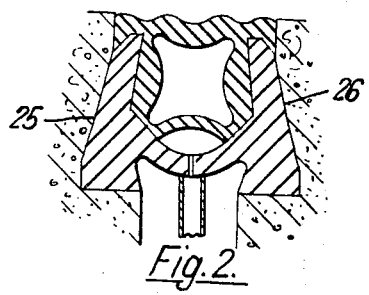
FIG. 2 shows a modification of the embodiment shown in FIG. 1.

In a modification of the present invention shown in FIG. 2, the outstanding lugs or feet on the sides of the H member are dispensed with and sloping outer faces 25, 26 are provided, the inclination of the faces being such that the faces converge towards the top of the seal, the corresponding faces of the structure defining the seal being also similarly inclined.

Figure 3:
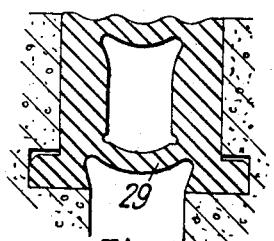
FIG. 3 shows a further modification.

In a further modification shown in FIG. 3, the seal is formed from one part there being only one longitudinal passage through the seal and in this case the portion 29 of the seal forming the bottom wall of the passage would be concave.

Figure 4:
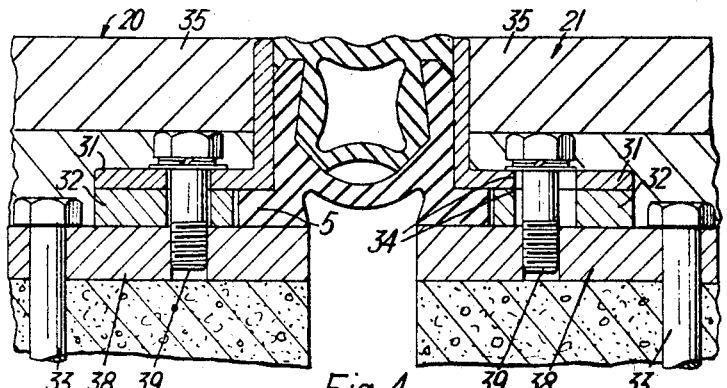
FIGS. 4, 5, 6 and 7 illustrate a seal mounted in a joint defined by various steelwork supports.

FIG. 4 shows an alternative method of fixing the seal in the joint between two bridge decks 20, 21. Here the lugs 5, 6 of the H member are nipped between structural steelwork attached to the concrete decks and adapted to hold the seal in position. This steelwork comprises fixing plates 38 fixed to the concrete of the decks by, for example, an epoxy resin and bolts 33, spacer pads 32, the thickness of which is slightly less than the depth of the lugs 5, 6 of the seal, and angle irons 31. The spacer pads 32 and angle irons 31 are provided with aligned holes through which fixing bolts 39 may pass, the bolts 39 being threaded into the fixing plates.

At least one of the angle irons 31 and one of the spacer pads 32 is provided with oval holes 34 for the bolts 39 such that the iron may be adjusted relative to the edge of the deck to vary the size of the gap in accordance with the temperature at the time of fitting. Tables are supplied to determine the dimension of this gap. With this arrangement the lugs of the H member are nipped between the fixing plates 38 and the angle irons 31 thus positively locating the seal relative to the deck. If desired, the outside walls of the H member may be bonded to the upstanding legs of the angle iron by an epoxy resin.

The design of the arrangement shown in FIGS. 4 to 7, makes an allowance for conditions of extreme cold where the joint width is greater than that which could reasonably be expected. In this instance, due to the fact that the lugs 5, 6 of the seal are clamped by the structural steelwork, the seal may expand beyond its undistorted condition and remain in the joint.

When the H member 1 of the seal has been fitted the deck and fixing steel are covered with asphalt 35 and thereafter the T member is fitted to complete the seal.

Figure 5:
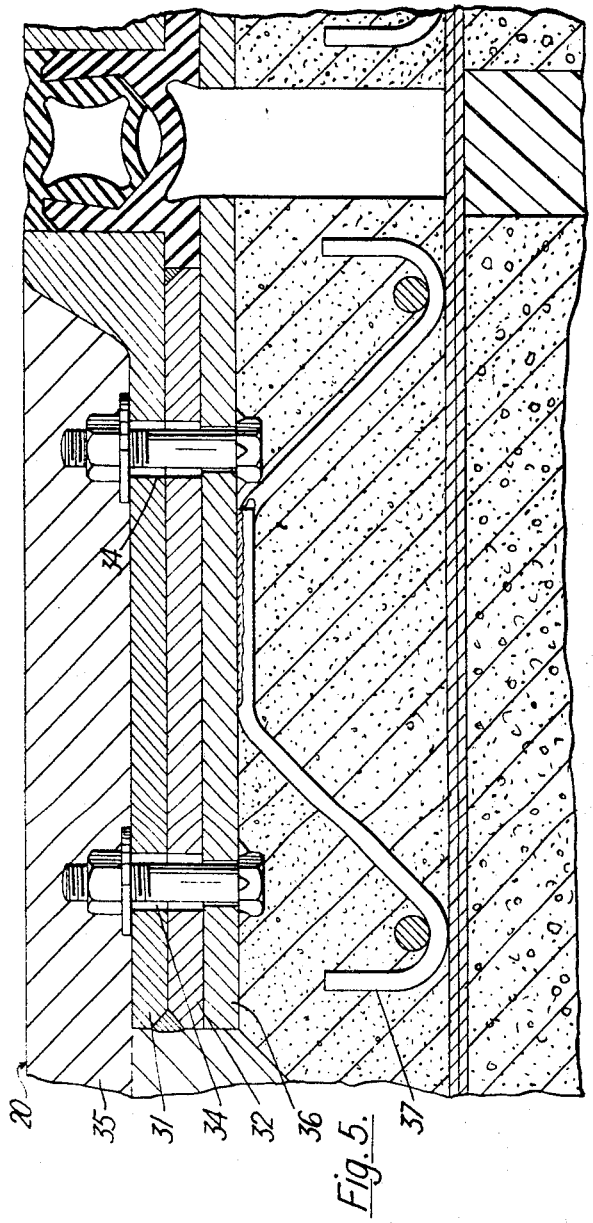

FIG. 5 shows an alternative method of attaching the fixing steel to the deck, in this case a steel plate 36 is welded to the reinforcing steel rods 37 which in turn are intended to form a strong attachment when concrete is poured and allowed to set round them.

Figure 6:
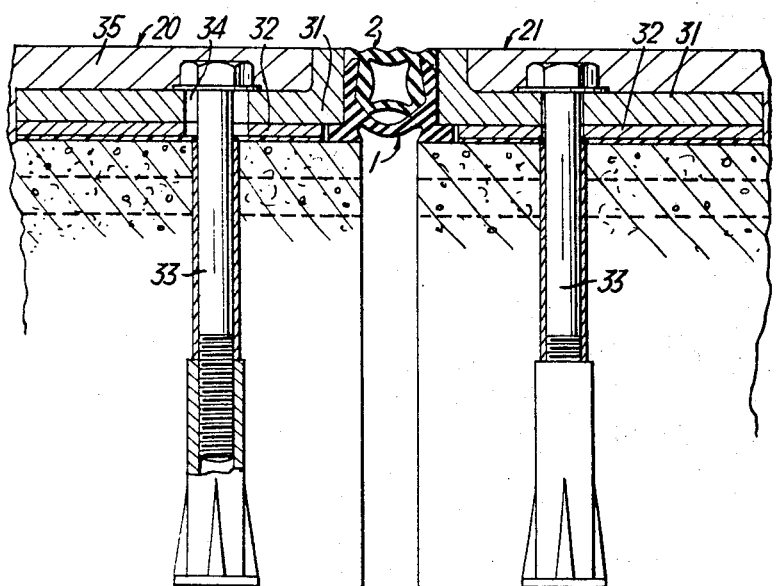
Figure 7:
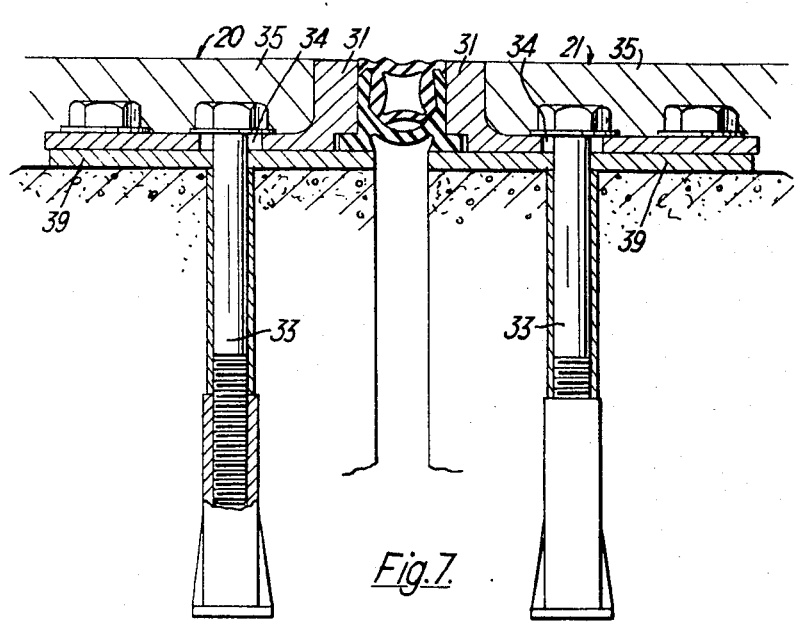
Figure 8:
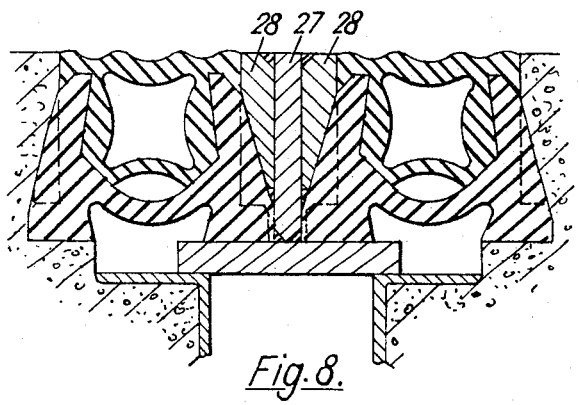
FIG. 8 shows two seals in use in a relatively wide joint.

FIGS. 6 and 7 show further alternative fixing methods. In a further modification two seals arranged side by side may be used to seal a relatively wide expansible joint in which case an elongated central steel member 27 of inverted T section is used to space the two seals, the member being provided with steel side projections 28 welded to the T, serving as cushions and defining locating grooves for the lugs of the seals.

In the above embodiments the seal is described in use between two concrete decks. It can be used also between two decks fabricated entirely from structural steelwork. In this instance the method of fixing may require slight modification to suit the particular conditions, the basic concept, however, remains unchanged.

We claim:

1. A flexible seal for a joint, the seal comprising a first part in the form of an elongated resilient channel adapted to be anchored in the joint member and a second part in the form of an elongated resilient member of substantially T cross-section interfitting with the first member with the upright of the T embraced by the walls defining the channel and the crosspiece of the T overlapping the walls of the channel, at least one of the bottom of the channel and the base of the T being formed with an arcuate indentation to provide a space between the bottom of the channel member and the bottom of the upright of the T part such that a longitudinal passage is defined between the parts of the seal.

2. A flexible seal as claimed in claim 1, in which the second part is provided with a longitudinal passage extending through the upright of the T, the walls of said passage being of substantially arcuate shape such that they are readily deformable under lateral compression.

3. A flexible seal as claimed in claim 1, in which the minimum cross-sectional area of the seal in a first longitudinal plane parallel to the crosspiece of the T is greater than the minimum cross-sectional area of the seal in a longitudinal plane parallel to the upright of the T.

4. A flexible seal as claimed in claim 1, including metal support members for locating and holding the seal in the joint, at least one of said support members defining elongated fixing apertures, and bolts passing through said apertures and engaging the structure defining the joint.

5. A flexible seal as claimed in claim 1, in which a hose pipe is connected to the seal in fluid communication with said longitudinal passage to remove moisture from said longitudinal passage.

References Cited

UNITED STATES PATENTS

| | | | |
|---|---|---|---|
| 2,156,681 | 5/1939 | Dewhirst et al. | 94—18.2 |
| 3,055,279 | 9/1962 | Rinker et al. | 94—18.2 |
| 3,218,941 | 11/1965 | Daum | 94—18 |
| 3,276,336 | 10/1966 | Crone | 94—18 |

FOREIGN PATENTS

| | | |
|---|---|---|
| 956,706 | 4/1964 | Great Britain. |
| 565,925 | 8/1957 | Italy. |

JACOB L. NACKENOFF, *Primary Examiner.*

UNITED STATES PATENT OFFICE
CERTIFICATE OF CORRECTION

Patent No. 3,387,544                                      June 11, 1968

Kenneth B. W. MacLellan et al.

It is certified that error appears in the above identified patent and that said Letters Patent are hereby corrected as shown below:

Column 4, line 49, cancel "member" and insert the same after "channel" in line 48, same column 4.

Signed and sealed this 3rd day of February 1970.

(SEAL)
Attest:

Edward M. Fletcher, Jr.
Attesting Officer

WILLIAM E. SCHUYLER, JR.
Commissioner of Patents